(12) United States Patent
Ellis-Monaghan et al.

(10) Patent No.: US 7,606,013 B2
(45) Date of Patent: Oct. 20, 2009

(54) ELECTRO-STATIC DISCHARGE PROTECTION CIRCUIT

(75) Inventors: John J. Ellis-Monaghan, Grand Isle, VT (US); Steven H. Voldman, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 11/612,033

(22) Filed: Dec. 18, 2006

(65) Prior Publication Data

US 2008/0144240 A1      Jun. 19, 2008

(51) Int. Cl.
*H02H 3/22* (2006.01)
(52) U.S. Cl. .......................................... 361/56; 361/111
(58) Field of Classification Search ................. 361/56, 361/111
See application file for complete search history.

(56) References Cited

U.S. PATENT DOCUMENTS

| | | | |
|---|---|---|---|
| 5,559,659 A | 9/1996 | Strauss | |
| 6,552,583 B1 | 4/2003 | Kwong | |
| 6,552,886 B1 | 4/2003 | Wu et al. | |
| 6,661,273 B1 | 12/2003 | Lai et al. | |
| 6,965,503 B2 | 11/2005 | Connor et al. | |
| 7,158,357 B2 * | 1/2007 | Hu | 361/56 |
| 2005/0285657 A1 * | 12/2005 | Watt | 327/313 |

* cited by examiner

*Primary Examiner*—Danny Nguyen
(74) *Attorney, Agent, or Firm*—Downs Rachlin Martin PLLC

(57) ABSTRACT

An electrostatic-discharge protection circuit having a low level of current leakage from a first power supply to a second power supply. An example protection circuit includes a timing element that electrically decouples the first and second power supplies. Another example protection circuit includes two transistors connected via a node that is electrically decoupled from the second power supply.

19 Claims, 3 Drawing Sheets

ELECTRO-STATIC DISCHARGE PROTECTION CIRCUIT

FIELD OF THE INVENTION

The present invention generally relates to the field of electro-static discharge protection circuit design. In particular, the present invention is directed to a low leakage electro-static discharge protection circuit.

BACKGROUND

Electro-static discharge (ESD) protection circuits have been utilized in ASIC environments for some time. These circuits protect the core circuitry of an integrated circuit from ESD events that may cause damage to the core circuitry. FIG. 1 illustrates a prior art ESD protection circuit 100 including a clamping device 105 between a first power supply 110 (e.g., Vdd) and a second power supply 115 (e.g., ground). Clamping device 105 is driven by a set of inverters, each inverter including a pair of transistors 120/125, 130/135, and 140/145. The inverters are triggered by an RC network, which in this example includes a diode connected transistor 150 as a resistor and a capacitor 155.

Current ESD protection circuits, such as circuit 100, suffer from current leakage at a level that has not been a serious problem in the ASIC, but that has a clearly undesirable impact on certain applications that require very low current leakage. Typical applications with low current leakage requirements include, but are not limited to, image processing chips, wireless communication chips, mobile application chips, and low power applications. The RC triggers of many ESD protection circuits have particular problems with current leakage across their capacitors. Additionally, many of today's applications require smaller and smaller chips. The capacitors of RC triggers can take up significant space on a chip that otherwise could be utilized for other functional purposes. RC triggers in ESD protection circuits are also tuned to activate based on a predetermined RC frequency response. This frequency response may be undesirable in certain applications, particularly applications involving radio frequency (e.g., cellular communications chips). An improved ESD protection circuit with lowered current leakage is desirable.

SUMMARY OF THE DISCLOSURE

In one embodiment, a low leakage ESD protection circuit is provided. The circuit includes a first power supply configured to operate at a first voltage; a second power supply configured to operate at a second voltage, said second voltage being less than said first voltage; one or more inverters, each of said one or more inverters having an input and an output; a clamping device positioned between said first and second power supplies, said clamping device joined with said output of at least one of said one or more inverters; and a timing element for triggering said one or more inverters, said timing element configured to not allow current flow from said first power supply to said second power supply through said timing element.

In another embodiment, a low leakage ESD protection circuit is provided. The circuit includes a first power supply configured to operate at a first voltage; a second power supply configured to operate at a second voltage, said second voltage being less than said first voltage; one or more inverters, each of said one or more inverters having an input and an output; a clamping device positioned between said first and second power supplies, said clamping device joined with said output of at least one of said one or more inverters; and a timing element for triggering said one or more inverters, said timing element including: a first transistor having a first gate, a first terminal, and a second terminal, said first gate being in electrical communication with said first power supply, said first terminal being in electrical communication with said first power supply; and a second transistor having a second gate, a third terminal, and a fourth terminal, said third terminal being in electrical communication with said second power supply, said fourth terminal being in electrical communication with said input of an initial one of said one or more inverters via a first node, said second gate being in electrical communication with said second terminal via a second node, said first node being decoupled from said first power supply, said second node being decoupled from said second power supply. The transistors can be a planar field effect transistor, a FINFET, or a MUGFET transistor.

In yet another embodiment, a low leakage ESD protection circuit is provided. The circuit includes a first power supply configured to operate at a first voltage; a second power supply configured to operate at a second voltage, said second voltage being less than said first voltage; one or more inverters, each of said one or more inverters having an input and an output; a clamping device positioned between said first and second power supplies, said clamping device joined with said output of at least one of said one or more inverters; and a timing element for triggering said one or more inverters, said timing element including: a first transistor having a first gate, a first terminal, and a second terminal, said first gate being in electrical communication with said first power supply, said first terminal being in electrical communication with said first power supply; and a second transistor having a second gate, a third terminal, and a fourth terminal, said third terminal being in electrical communication with said second power supply, said fourth terminal being in electrical communication with only said input of an initial one of said one or more inverters via a first node, said second gate being in electrical communication with only said second terminal via a second node, said first node being decoupled from said first power supply, said second node being decoupled from said second power supply. The transistors can be a planar field effect transistor, a FINFET, or a MUGFET transistor.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
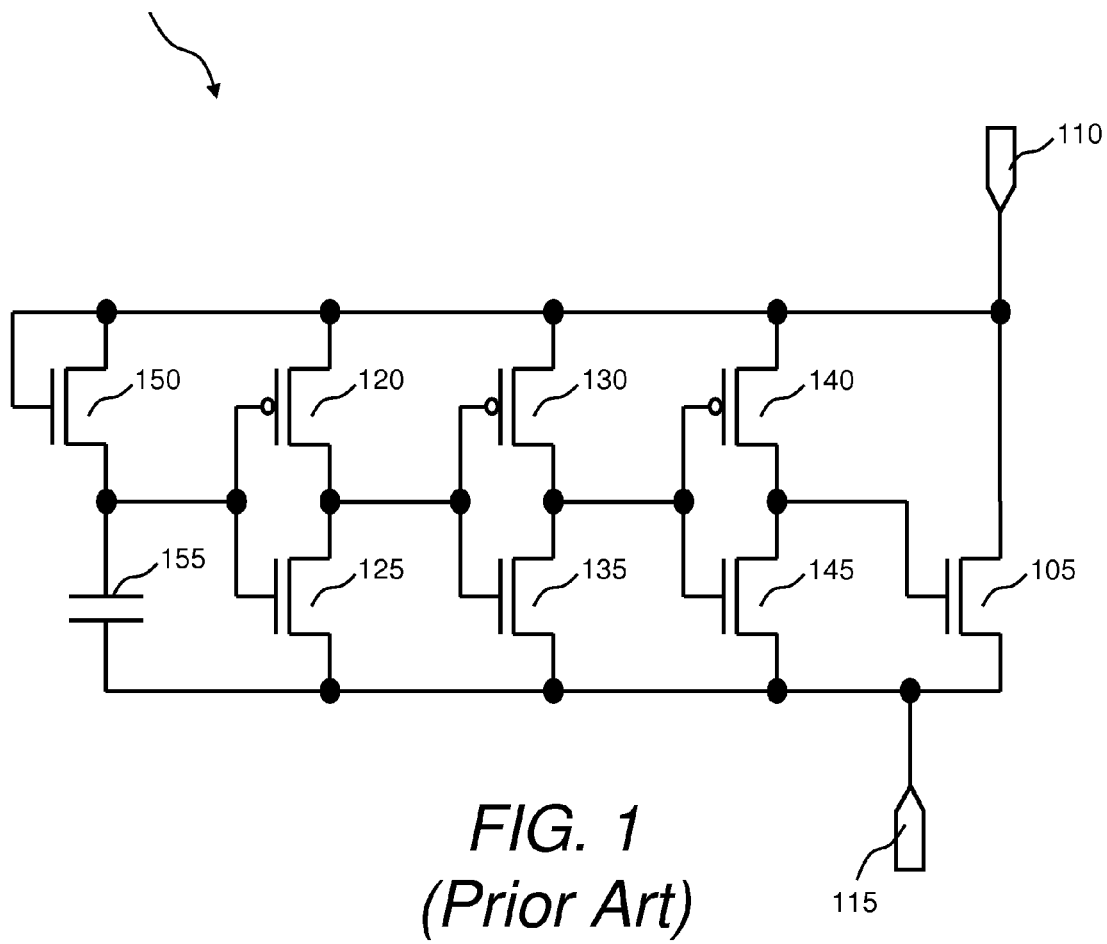
FIG. 1 illustrates an example prior art ESD protection circuit.
Figure 2:
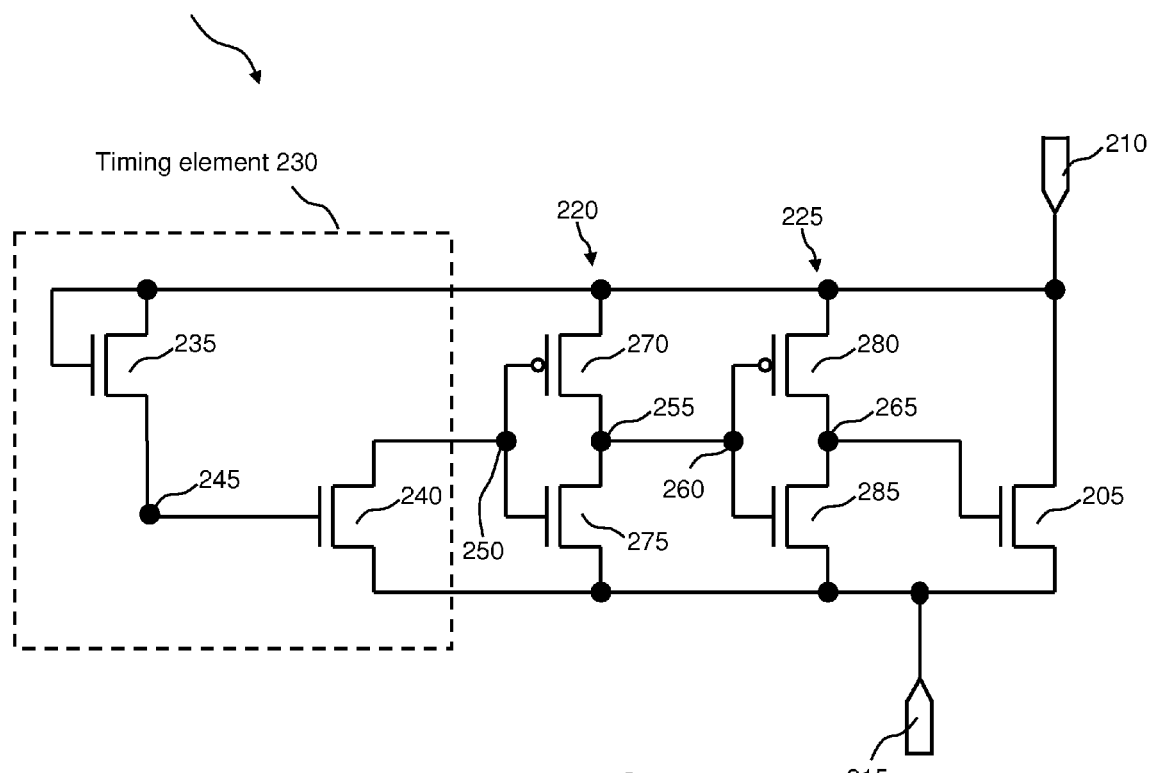
FIG. 2 illustrates one embodiment of an ESD protection circuit.

FIG. 2 illustrates one embodiment of a low leakage ESD protection circuit 200 (also referred to as ESD circuit 200). Circuit 200 includes a clamping device 205 positioned between a power supply 210 and a power supply 215. Power supplies 210 and 215 may be configured to operate at any voltage. In one example, power supply 210 is configured to operate at Vdd and power supply 215 is configured to operate at ground. In another example, power supply 210 is configured to operate at a voltage that is higher than the voltage of power supply 215.

Clamping device 205 is driven by one or more inverters. Here the one or more inverters includes a first inverter 220 a second inverter 225. Inverters 220 and 225 are triggered by a timing element 230. Timing element 230 includes a transistor 235 and a transistor 240. The gate and one of the terminals of transistor 235 are in electrical communication with power supply 210. Another terminal of transistor 235 is connected to the gate of transistor 240 via node 245. Node 245 is electrically decoupled from power supply 210. As discussed above, RC triggers of current ESD protection circuits include one or more capacitors connected to a second power supply (typically ground). Thus, an RC trigger is at a minimum coupled to the second power supply in the alternating current (AC) domain. In timing element 230, power supply 210 is not electrically coupled to power supply 215, providing no path for current leakage through timing element 230. Additionally, this example of timing element 230 does not include a capacitor and, thus, may require less space in a circuit design than typical RC triggered ESD protection circuits and does not have the oxide leakage due to a capacitor. In an alternate example, timing element 230 may include additional circuit elements including, but not limited to, a resistor element, a n-channel MOSFET element, a p-channel MOSFET element, a diode element, and any combinations thereof, positioned to retain the decoupling of power supply 210 and power supply 215 through timing element 230. The transistors can be a planar field effect transistor, a FINFET, or a MUGFET transistor.

Timing element 230 is connected to the initial inverter of the one or more inverters, namely inverter 220 via an input node 250. Input node 250 is electrically decoupled from power supply 210. An output node 255 of inverter 220 is in electrical communication with an input node 260 of inverter 225. An output node 265 is in electrical communication with clamping device 205 (e.g., output node 265 drives a gate of clamping device 205).

Clamping device 205 is shown as an n-type field effect transistor (FET). Those of ordinary skill will recognize that many alternative clamping devices may be utilized singly or in an arrangement of multiple circuit elements. Example clamping devices include, but are not limited to, a transistor (e.g., an n-type FET, a p-type FET), a bipolar element, a heterojunction bipolar transistor, and any combinations thereof. In one example, a clamping device may include an n-type MOSFET. In another example, a clamping device may include a p-type MOSFET. In yet another example, a clamping device may include a thick oxide. In still another example, a clamping device may include a thin oxide. The transistors can be a planar field effect transistor, a FINFET, or a MUGFET transistor.

Inverter 220 includes a pair of transistors 270, 275 and inverter 225 includes a pair of transistors 280, 285. Transistors 270, 275, 280, 285 may be include any known transistor technology. Example transistors include, but are not limited to, an n-type field effect transistor, a p-type field effect transistor, an insulated gate field effect transistor, a metal-oxide semiconductor field effect transistor (MOSFET), a FinFET, a MUGFET, a JFET, and any combinations thereof. In one example, transistors 270, 275, 280, 285 may include oxides that are categorized as thin or thick, as is recognized by those of ordinary skill. In one example, transistor 270 is a thick oxide p-type MOSFET, transistor 275 is a thick oxide n-type MOSFET, transistor 280 is a thick oxide p-type MOSFET, and transistor 285 is a thick oxide n-type MOSFET. ESD circuit 200 is shown with two inverters 220, 225. Alternatively, any number of inverters may be utilized and configured between power supplies 210 and 215 in a variety of ways that are known. In one example, an ESD circuit may include an even number of inverters. In another example, an ESD circuit may include an odd number of inverters. Those of ordinary skill will recognize how to configure the proper number of inverters (e.g., with the proper combination of FET's) to drive a particular clamping device, such as clamping device 205.

Figure 3:
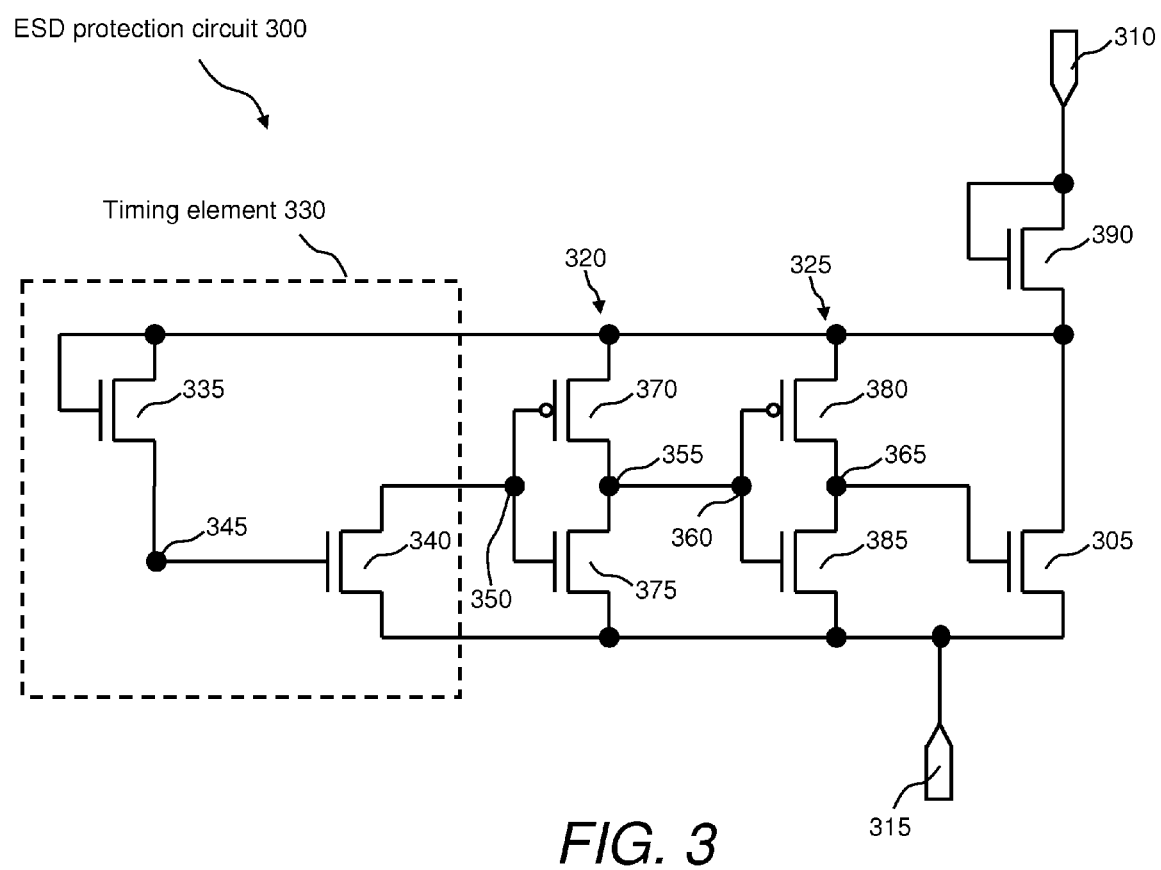
FIG. 3 illustrates another embodiment of an ESD protection circuit.

FIG. 3 illustrates another embodiment of an ESD circuit 300. ESD circuit 300 includes a clamping device 305 connected between a power supply 310 and a power supply 315. ESD circuit 300 also includes inverters 320 and 325, triggered by a timing element 330. Timing element 330 includes a transistor 335 having a terminal in electrical communication with a gate of a transistor 340 via a node 345. Transistor 335 also has a gate and another terminal connected to power supply 310. Transistor 340 includes a terminal in electrical communication with power supply 315 and another terminal in electrical communication with an input node 350 of inverter 320. Inverter 320 also includes an output node 355 in electrical communication with an input node 360 of inverter 325. Inverter 325 also includes an output node 365 joined with clamping device 305. Inverter 220 includes a pair of transistors 370, 375 and inverter 225 includes a pair of transistors 380, 385. ESD circuit 300 also includes a transistor 390 connected between power supply 310 and clamping device 305, inverters 320, 325, and timing element 330.

In one example of an ESD circuit (e.g., ESD circuit 200 of FIG. 2), a lower level of current leakage is obtained over prior ESD circuits, such as those employing an RC trigger. Additionally, an example ESD circuit (e.g., ESD circuit 200) that does not employ a capacitor in a timing element (e.g., timing element 230 of FIG. 2) may require less space in a circuit design than ESD circuits that do employ a capacitor. In another aspect, an example timing element, such as timing element 230 of FIG. 2, may not produce a frequency response that may interfere with core circuitry to which an ESD circuit may be associated (e.g., radio frequency circuitry that may be sensitive to an additional frequency response in the circuitry).

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A low leakage ESD protection circuit comprising:
   a first power supply configured to operate at a first voltage;
   a second power supply configured to operate at a second voltage, said second voltage being less than said first voltage;
   one or more inverters, each of said one or more inverters having an input and an output;
   a clamping device positioned between said first and second power supplies, said clamping device joined with said output of at least one of said one or more inverters; and
   a timing element for triggering said one or more inverters, said timing element configured to not allow current flow from said first power supply to said second power supply through said timing element, said timing element including:
   a first transistor having a first terminal and a second terminal, said first terminal being in electrical communication with said first power supply; and
   a second transistor having a first gate, a third terminal, and a fourth terminal, said third terminal being in electrical communication with said second power supply, said fourth terminal being in electrical communication with said input of an initial one of said one or more inverters via a first node, said second gate being in electrical communication with said second terminal via a second node, said second node being decoupled from said second power supply.

2. An ESD protection circuit according to claim 1, wherein said third terminal is connected only with said second terminal.

3. An ESD protection circuit according to claim 1, wherein said fourth terminal is connected only with said input of said initial one of said one or more inverters.

4. An ESD protection circuit according to claim 1, wherein said first node is decoupled from said first power supply.

5. An ESD protection circuit according to claim 1, wherein said first transistor includes a thin oxide, n-type field effect transistor and said second transistor includes a thick oxide, n-type field effect transistor.

6. An ESD protection circuit according to claim 1, wherein each of said one or more inverters includes a p-type field effect transistor and an n-type field effect transistor.

7. An ESD protection circuit according to claim 1, wherein said first transistor includes a second gate in electrical communication with said first power supply.

8. An ESD protection circuit according to claim 1, wherein said one or more inverters consists of an odd number of inverters.

9. An ESD protection circuit according to claim 1, wherein said one or more inverters consists of an even number of inverters.

10. An ESD protection circuit according to claim 1, further comprising a third transistor positioned between said first power supply and said clamping device and said one or more inverters.

11. A low leakage ESD protection circuit comprising:
a first power supply configured to operate at a first voltage;
a second power supply configured to operate at a second voltage, said second voltage being less than said first voltage;
one or more inverters, each of said one or more inverters having an input and an output;
a clamping device positioned between said first and second power supplies, said clamping device joined with said output of at least one of said one or more inverters; and
a timing element for triggering said one or more inverters, said timing element including:
a first transistor having a first gate, a first terminal, and a second terminal, said first gate being in electrical communication with said first power supply, said first terminal being in electrical communication with said first power supply; and
a second transistor having a second gate, a third terminal, and a fourth terminal, said third terminal being in electrical communication with said second power supply, said fourth terminal being in electrical communication with said input of an initial one of said one or more inverters via a first node, said second gate being in electrical communication with said second terminal via a second node, said first node being decoupled from said first power supply, said second node being decoupled from said second power supply.

12. An ESD protection circuit according to claim 11, wherein said third terminal is connected only with said second terminal.

13. An ESD protection circuit according to claim 11, wherein said fourth terminal is connected only with said input of said initial one of said one or more inverters.

14. An ESD protection circuit according to claim 11, wherein said first transistor includes a thin oxide, n-type field effect transistor and said second transistor includes a thick oxide, n-type field effect transistor.

15. An ESD protection circuit according to claim 11, wherein said one or more inverters consists of an odd number of inverters.

16. An ESD protection circuit according to claim 11, wherein said one or more inverters consists of an even number of inverters.

17. A low leakage ESD protection circuit comprising:
a first power supply configured to operate at a first voltage;
a second power supply configured to operate at a second voltage, said second voltage being less than said first voltage;
one or more inverters, each of said one or more inverters having an input and an output;
a clamping device positioned between said first and second power supplies, said clamping device joined with said output of at least one of said one or more inverters; and
a timing element for triggering said one or more inverters, said timing element including:
a first transistor having a first gate, a first terminal, and a second terminal, said first gate being in electrical communication with said first power supply, said first terminal being in electrical communication with said first power supply; and
a second transistor having a second gate, a third terminal, and a fourth terminal, said third terminal being in electrical communication with said second power supply, said fourth terminal being in electrical communication with only said input of an initial one of said one or more inverters via a first node, said second gate being in electrical communication with only said second terminal via a second node, said first node being decoupled from said first power supply, said second node being decoupled from said second power supply.

18. An ESD protection circuit according to claim 17, wherein said one or more inverters consists of an odd number of inverters.

19. An ESD protection circuit according to claim 17, wherein said one or more inverters consists of an even number of inverters.

* * * * *